(12) United States Patent
Blattert et al.

(10) Patent No.: US 10,377,361 B2
(45) Date of Patent: Aug. 13, 2019

(54) METHOD FOR BRAKING A VEHICLE WITH A HYDRAULIC VEHICLE BRAKE AND AN ELECTROMECHANICAL BRAKING DEVICE

(71) Applicant: Robert Bosch GmbH, Stuttgart (DE)

(72) Inventors: Dieter Blattert, Kirchheim/Neckar (DE); Edith Mannherz, Weinsberg (DE); Frank Baehrle-Miller, Schoenaich (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/478,314

(22) Filed: Apr. 4, 2017

(65) Prior Publication Data
US 2017/0341633 A1 Nov. 30, 2017

(30) Foreign Application Priority Data
May 24, 2016 (DE) ........................ 10 2016 208 944

(51) Int. Cl.
| | | |
|---|---|---|
| *B60T 8/96* | (2006.01) | |
| *B60T 13/66* | (2006.01) | |
| *B60T 13/74* | (2006.01) | |
| *B60T 7/12* | (2006.01) | |
| *B60T 8/32* | (2006.01) | |

(Continued)

(52) U.S. Cl.
CPC ................ *B60T 8/96* (2013.01); *B60T 7/042* (2013.01); *B60T 7/12* (2013.01); *B60T 8/321* (2013.01); *B60T 8/341* (2013.01); *B60T 8/4081* (2013.01); *B60T 13/142* (2013.01); *B60T 13/146* (2013.01); *B60T 13/58* (2013.01); *B60T 13/588* (2013.01); *B60T 13/662* (2013.01); *B60T 13/686* (2013.01); *B60T 13/741* (2013.01); *B60T 13/746* (2013.01); *B60T 2270/402* (2013.01); *B60T 2270/403* (2013.01)

(58) Field of Classification Search
CPC ... B60T 8/92; B60T 8/96; B60T 8/321; B60T 8/3255; B60T 8/326; B60T 8/3265; B60T 13/142; B60T 13/143; B60T 13/145; B60T 13/146; B60T 13/58; B60T 13/588; B60T 13/662; B60T 13/686; B60T 13/741; B60T 13/746; B60T 13/748
USPC .............. 303/122.09, 122.1, 122.13, 122.14, 303/122.15, 20
See application file for complete search history.

(56) References Cited

U.S. PATENT DOCUMENTS 6,250,436 B1 * 6/2001 Oikawa ................... B60T 1/065
188/1.11 E
6,311,808 B1 * 11/2001 Halasy-Wimmer ..... B60R 25/08
188/106 F (Continued)

FOREIGN PATENT DOCUMENTS

DE    10 2004 004 992 A1    9/2005

*Primary Examiner* — Thomas J Williams
(74) *Attorney, Agent, or Firm* — Maginot, Moore & Beck LLP (57) ABSTRACT

A method for braking a vehicle includes at least reducing a hydraulic brake pressure in at least one wheel brake device disposed on a vehicle axle in response to an at least partial failure of a brake boosting of a hydraulic brake with at least one first brake circuit and at least one second brake circuit. The method further includes operating an electric brake motor of an electromechanical braking device to produce a braking force on the at least one wheel brake device.

19 Claims, 4 Drawing Sheets

(51) Int. Cl.
*B60T 8/34* (2006.01)
*B60T 13/14* (2006.01)
*B60T 13/58* (2006.01)
*B60T 7/04* (2006.01)
*B60T 8/40* (2006.01)
*B60T 13/68* (2006.01)

(56) References Cited

U.S. PATENT DOCUMENTS

| | | | |
|---|---|---|---|
| 8,494,745 B2 * | 7/2013 | Schneider | B60T 7/107 |
| | | | 303/3 |
| 2003/0193239 A1 * | 10/2003 | Reuter | B60T 7/042 |
| | | | 303/122.09 |
| 2007/0278856 A1 * | 12/2007 | Craig | B60T 13/588 |
| | | | 303/122.09 |
| 2008/0223670 A1 * | 9/2008 | Toyohira | B60T 7/042 |
| | | | 188/152 |
| 2013/0127237 A1 * | 5/2013 | Pfeiffer | B60T 8/4018 |
| | | | 303/6.01 |
| 2014/0015310 A1 * | 1/2014 | Hanzawa | B60T 7/12 |
| | | | 303/3 |
| 2015/0115698 A1 * | 4/2015 | Brok | B60T 13/146 |
| | | | 303/3 |
| 2015/0266457 A1 * | 9/2015 | Johnson | B60T 7/042 |
| | | | 303/15 |
| 2018/0029577 A1 * | 2/2018 | Beauvais | B60T 8/96 |

* cited by examiner

METHOD FOR BRAKING A VEHICLE WITH A HYDRAULIC VEHICLE BRAKE AND AN ELECTROMECHANICAL BRAKING DEVICE

This application claims priority under 35 U.S.C. § 119 to patent application no. DE 10 2016 208 944.7, filed on May 24, 2016 in Germany, the disclosure of which is incorporated herein by reference in its entirety.

The disclosure concerns a method for braking a vehicle with a hydraulic vehicle brake and an electromechanical braking device.

BACKGROUND

A parking brake system in a vehicle is described in DE 10 2004 004 992 A1 in which a clamping force holding the vehicle at a standstill is produced by means of an electric brake motor by the electric brake motor displacing a brake piston against a brake disk. The parking brake system is integrated within the hydraulic vehicle brakes. In the normal braking mode, the brake piston is pressed against the brake disk by the hydraulic brake fluid.

SUMMARY

The method according to the disclosure concerns a vehicle with a hydraulic vehicle brake, by means of which the vehicle is braked during normal brake operation. The hydraulic vehicle brake preferably comprises at least one first brake circuit and one second brake circuit as well as a brake boosting means to boost the brake pressure produced by the driver.

The brake boosting is for example implemented by means of an electrically controlled actuator that is advantageously connected downstream of a master brake cylinder of the vehicle brake. The electrically controlled actuator is for example a plunger that is driven by an electric motor. The plunger displaces brake fluid in the brake circuit and builds up hydraulic brake pressure.

In a preferred implementation, the vehicle brake is provided with an additional hydraulic supply line that connects a brake fluid reservoir to outlet valves of wheel brake devices. If an electrically controlled actuator that is connected downstream of the master brake cylinder of the vehicle brakes is provided, said actuator is preferably disposed in the additional hydraulic supply line between the brake fluid reservoir and the wheel brake devices.

In a further advantageous implementation, the hydraulic vehicle brake is in the form of an electrohydraulic brake system, in which the operation of the brake pedal is sensed and is converted by means of an electrically controlled actuator, in particular a hydraulic pump, into a hydraulic brake pressure at the wheel brake devices. In addition, at least some of the wheel brake devices are each equipped with an electromechanical braking device with an electric brake motor, in particular the wheel brake devices on the rear axle. Furthermore, at least one hydraulic supply line with an isolating valve is disposed between the master brake cylinder and a wheel brake device, said valve being shut off in a normal braking process, but being switched to pass flow in the event of a partial failure or a complete failure of the brake boosting of the hydraulic vehicle brake. The isolating valve is disposed in particular in the hydraulic supply line to a wheel brake device without an electromechanical braking device. Advantageously, hydraulic supply lines are provided to the two wheel brake devices on the front axle, within each of which a controlled isolating valve is integrated.

In the case of a partial or complete failure of the brake boosting, the isolating valve is or the isolating valves are closed and thereby switched to pass flow, so that the operation of the brake pedal that is performed by the driver leads directly to a hydraulic brake pressure in the associated wheel brake device, by means of which a braking force is built up.

According to a further useful implementation, in the event of a partial failure or a complete failure of the brake boosting of the hydraulic vehicle brake, the wheel brake devices that are provided with an electromechanical braking device with an electric brake motor are supplied with hydraulic fluid from the master brake cylinder when the brake pedal is operated. Also in this case, there are hydraulic supply lines between the master brake cylinder and the relevant wheel brake devices with integrated isolating valves, which are shut off during normal functioning but are switched to pass flow in the event of a partial or complete failure of the brake boosting.

A pedal travel simulator can be associated with the brake pedal to ensure a natural pedal feel when operating the brake pedal. The pedal travel simulator is preferably connected downstream of the master brake cylinder. In the event of a partial or complete failure of the brake boosting, it can be useful to shut off a valve that is disposed between the master brake cylinder and the pedal travel simulator, whereby it is achieved that additional hydraulic volume is supplied in the brake circuit and a higher brake pressure is achieved.

The vehicle is moreover equipped with at least one electromechanical braking device that comprises an electric brake motor, the operation of which moves a brake piston against a brake disk. The electromechanical braking device is for example used as a holding brake or a parking brake to produce a clamping force that holds the vehicle at a standstill. The electromechanical braking device can however also be used while the vehicle is travelling to produce a braking force that reduces the speed of the vehicle.

The electromechanical braking device and the hydraulic vehicle brake act in a common wheel brake device and each can move the same brake piston against a brake disk.

With the method, in the event of a partial failure or a complete failure of the brake boosting of the hydraulic vehicle brake, the hydraulic brake pressure in at least one wheel brake device on a vehicle axle is at least reduced. The electric brake motor in said wheel brake device is operated to produce a braking force. This procedure has the advantage that the failure of the brake boosting can be at least partly compensated by the operation of the electric brake motor and the production of an electromechanical braking force.

It is furthermore advantageous that owing to the reduction or the disconnection of the hydraulic brake pressure in the at least one wheel brake device, accordingly a smaller hydraulic volume or no hydraulic volume is displaced in said wheel brake device, so that less hydraulic fluid has to be displaced on one or more further wheel brake devices of the hydraulic vehicle brake to apply a defined brake pressure. This improves the brake pedal feel. Overall, driving safety is thereby improved both in an objective and also in a subjective way in the event of a partial failure or a complete failure of the brake boosting of the hydraulic vehicle brake.

At least one wheel brake device is for both hydraulic operation and also for operation by means of the electric brake motor. Advantageously, electric brake motors are seated on each of the two wheel brake devices on the rear axle of the vehicle, so that a braking force can be produced on said wheel brake devices both electromechanically by operating the electric brake motor and also hydraulically by means of the hydraulic vehicle brake. In the event of a partial failure or a complete failure of the brake boosting of the hydraulic vehicle brake, the hydraulic brake pressure on both wheel brake devices on the rear axle is at least reduced and the electric brake motors on said wheel brake devices are operated to produce a braking force. This is carried out in the event of a partial failure or a complete failure of the brake boosting, whereas in the normal case—without a brake boosting failure—the electric brake motors on the two rear wheel brake devices are only used as a parking brake or a holding brake for holding the vehicle at a standstill.

According to an advantageous implementation, the hydraulic brake pressure is completely cut off in the at least one wheel brake device in which the electric brake motor is operated in the event of a partial failure or a complete failure of the brake boosting. Accordingly, a volume displacement of hydraulic brake fluid is avoided in said at least one wheel brake device, so that in the event of the operation of the brake pedal the hydraulic fluid is displaced to the other wheel brake devices and the brake pedal feel is the same as or at least similar to that with intact brake boosting. Moreover, an increased hydraulic braking force is produced on the remaining wheel brake devices, whereby the partial failure or complete failure of the brake boosting is at least partly compensated.

In a preferred implementation, only the two wheel brake devices on the rear axle of the vehicle are additionally fitted with an electric brake motor, but not the wheel brake devices on the front axle of the vehicle.

According to yet another advantageous implementation, following the detection of a partial failure or a complete failure of the brake boosting, but still before the detection of a driver's braking demand, the electric brake motor is moved so far in the clamping direction until a brake contact point is reached at which the brake piston that is acted upon by the brake motor is in contact with the brake disk without an air gap. Said procedure has the advantage that following the detection of the driver's braking demand, an electromechanical braking force can be produced by operating the electric brake motor without a time delay by moving the brake motor further in the clamping direction.

The time interval for building up an electromechanical braking force is reduced.

According to a further advantageous implementation, the electric brake motor is returned to the release position following termination of the driver's braking demand. However, this is advantageously carried out only until the brake contact point is reached, at which the brake piston, including the brake lining, is in contact with the brake disk without an air gap or with a considerably reduced air gap. In the event of a further driver's braking demand, this can be implemented without a time delay by means of further clamping of the electric brake motor and the generation of an electromechanical braking force.

According to yet another useful implementation, an outlet valve on the at least one wheel brake device, which is either only supplied with reduced hydraulic brake pressure or at which the brake pressure is cut off, is opened during the braking process and is closed following completion of the braking process. Said procedure has the advantage that the brake pistons in the wheel brake devices that are moved by an electric brake motor can suck brake fluid volume from the reservoir container via the opened outlet valves of the other wheel brake devices. Following completion of the electromechanical force build-up, the outlet valves on the other wheel brake devices are closed again.

Following cancellation of the driver's braking demand, the electric brake motor of the electromechanical braking device is set into the release position to remove the electromechanical braking force. This may be carried out with a time delay, whereby a slight jolt in the vehicle is transmitted to the driver haptically and with a time offset relative to the point in time of the cancellation of the driver's braking demand, according to which the vehicle is apparently accelerating. The driver is given feedback in this way that the hydraulic vehicle brake is in a fault mode, because the brake boosting is not functioning or is not functioning fully.

Following termination of the driver's braking demand, advantageously the hydraulic decoupling of the wheel brake device at the front and rear axles is removed again. This has the advantage that in the event of a fault of the electromechanical braking device, hydraulic brake pressure can be built up on the wheel brake devices both on the front axle and also on the rear axle by means of the hydraulic vehicle brake.

According to a further advantageous implementation, the time interval between the cancellation of the driver's braking demand and the reduction of the electromechanical braking force is used to open inlet valves in the hydraulic brake circuit on the wheel brake devices of the rear axle. This procedure has the advantage that a hydraulic volume of the brake fluid is already received at the wheel brake devices of the rear axle because of the electromechanical displacement of the brake piston. On enabling the hydraulic path by opening the inlet valves, a further brake fluid volume can be displaced into the brake circuit(s) with the wheel brake devices on the rear axle, whereby a higher hydraulic deceleration is achieved at the wheel brake devices of the rear axle.

According to yet another advantageous implementation, the electric brake motor of the electromechanical braking device is only operated to produce electromechanical braking force if a target deceleration threshold value is exceeded. The target deceleration threshold value is for example determined using the current brake pedal travel, which can be detected using a brake pedal travel sensor. This procedure ensures that the electric brake motor of the electromechanical braking device is only activated to produce an emergency deceleration and accordingly the frequency of activation is reduced.

The different steps of the method are carried out in a regulating device or a control unit, in which control signals are produced for controlling the different components of the brake system, which include both the hydraulic vehicle brakes, including an actuator for the brake boosting, and also the electromechanical braking devices, each with an electric brake motor.

BRIEF DESCRIPTION OF THE DRAWINGS

Further advantages and advantageous implementations can be found in the further claims, the description of the figures and the drawings.

There are shown in.

DETAILED DESCRIPTION

In the figures, identical components are provided with the same reference characters.

Figure 1:
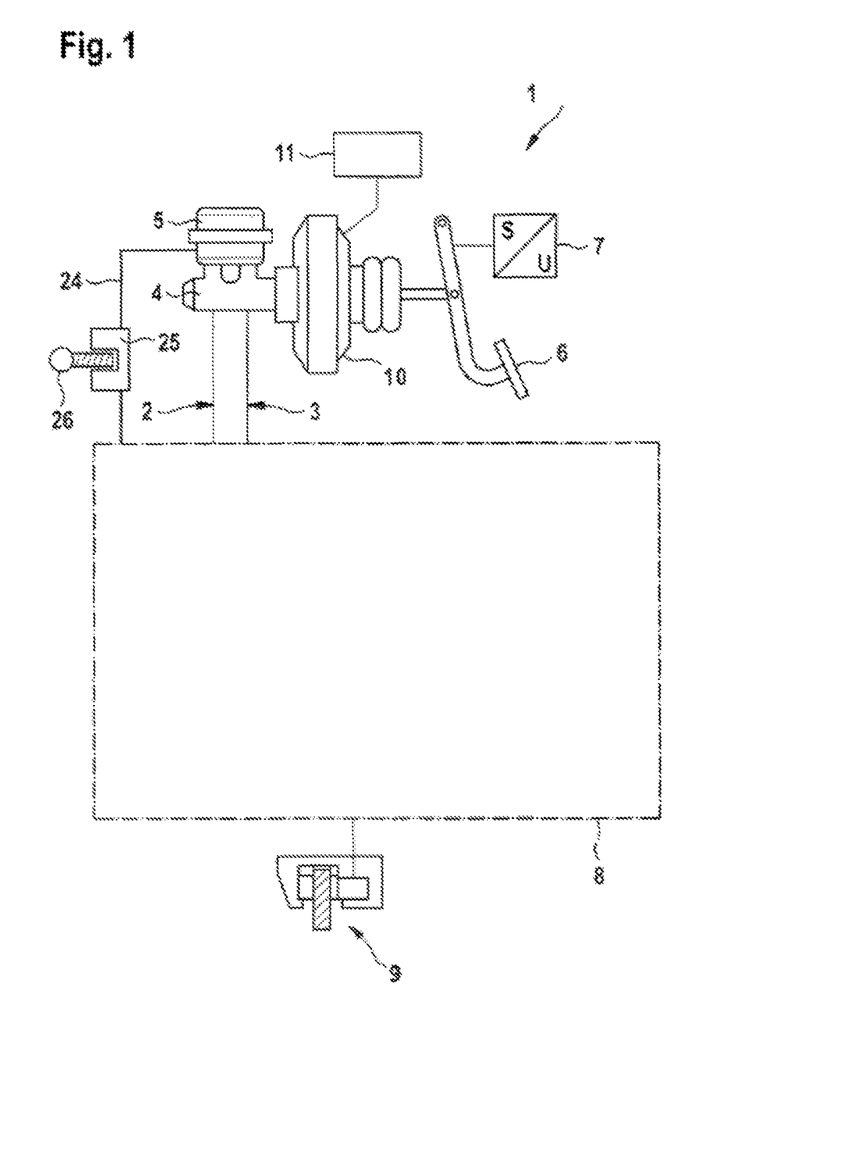
FIG. 1 shows a schematic representation of a hydraulic vehicle brake with a brake booster forming an actuator, wherein the wheel brake devices of the vehicle brakes on the rear axle of the vehicle are additionally implemented as an electromechanical braking device with an electric brake motor.

The hydraulic vehicle brake 1 for a vehicle represented in FIG. 1 comprises a front axle brake circuit 2 and a rear axle brake circuit 3 for supplying and controlling wheel brake devices 9 on each wheel of the vehicle with a brake fluid under hydraulic pressure. The two brake circuits 2, 3 are connected to a common master brake cylinder 4 that is supplied with brake fluid by means of a brake fluid reservoir 5. The master brake cylinder piston within the master brake cylinder 4 is operated by the driver by means of the brake pedal 6 and the pedal travel caused by the driver is measured by means of a pedal travel sensor 7. A brake booster 10 that comprises for example an electric motor that is preferably operated by means of a gearbox of the master brake cylinder 4 (iBooster) is disposed between the brake pedal 6 and the master brake cylinder 4. The brake booster 10 forms an electrically controlled actuator for influencing the brake pressure.

The control movement of the brake pedal 6 measured by the pedal travel sensor 7 is transmitted as a sensor signal to a regulating or control unit 11, in which control signals for controlling the brake booster 10 are generated. The supply of the wheel brake devices 9 with brake fluid is carried out in each brake circuit 2, 3 via various switching valves, which in common with further units are part of a brake hydraulic system 8. Furthermore, the brake hydraulic system 8 contains a hydraulic pump that is a component of an electronic stability program (ESP).

The brake boosting can additionally or alternatively be carried out using an electrically controlled actuator, which is connected downstream of the master brake cylinder 4 of the vehicle brake 1. With the actuator, the boosting is provided for example by means of an electric motor 26 that displaces a plunger 25. Said plunger is disposed after the master brake cylinder 4 and can produce brake pressure in the two brake circuits.

The vehicle brake 1 is provided with an additional hydraulic supply line 24 that connects the brake fluid reservoir 5 to the outlet valves of wheel brake devices 9. The plunger 25 controlled by the electric motor 26 is integrated within the supply line 24.

Figure 2:
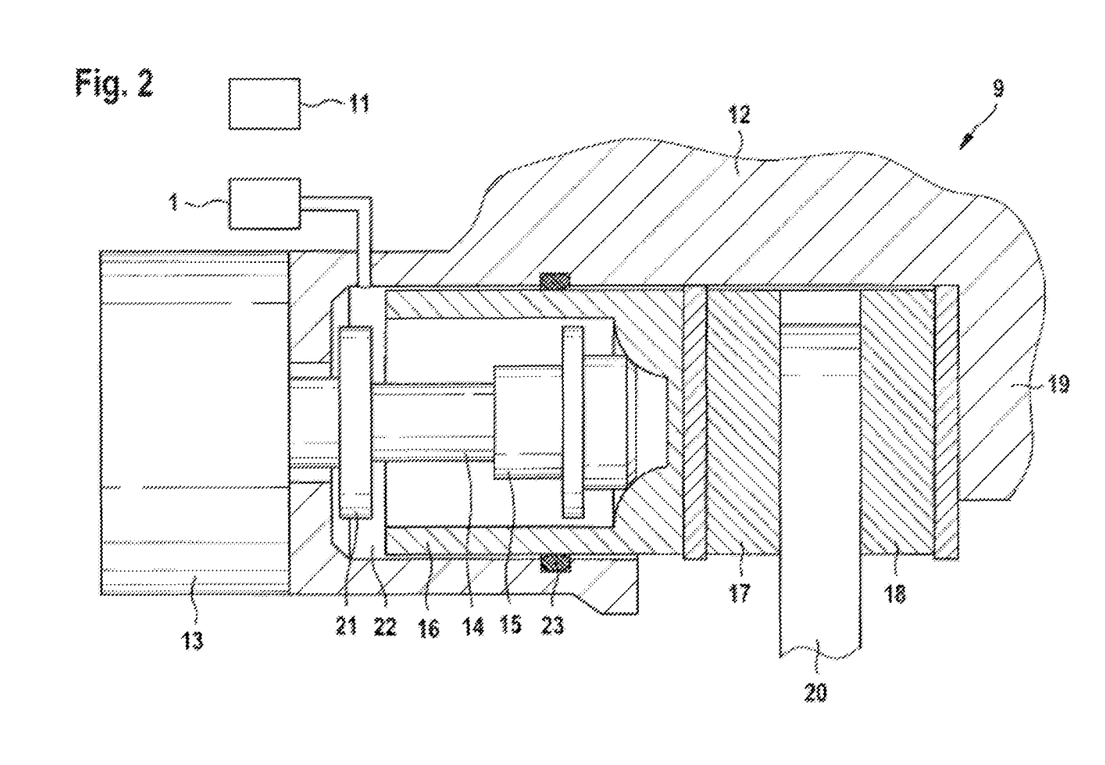
FIG. 2 shows a section through an electromechanical braking device with an electric brake motor.

The wheel brake device 9 that is disposed on a wheel on the rear axle of the vehicles represented in detail in FIG. 2. The wheel brake device 9 is part of the hydraulic vehicle brake 1 and is supplied with brake fluid 22 from the rear axle brake circuit. Moreover, the wheel brake device 9 comprises an electromechanical braking device that is preferably used for holding a vehicle at a standstill, but that can also be used during movement of the vehicle, in particular for braking the vehicle at lower vehicle speeds below a speed limit value.

The electromechanical braking device comprises a brake caliper 12 with a claw 19 that engages round a brake disk 20. As a control element, the braking device comprises a d.c. electric motor as the brake motor 13, the rotor shaft of which rotationally drives a spindle 14 on which a spindle nut 15 is rotationally supported. During rotation of the spindle 14, the spindle nut 15 is moved axially. The spindle nut 15 moves within a brake piston 16 that is the support for a brake lining 17 that is pressed against the brake disk 20 by the brake piston 16. A further brake lining 18 that is held positionally fixedly on the claw 19 is disposed on the opposite side of the brake disk 20. The brake piston 16 is sealed flow tight on the outside thereof relative to the accommodating housing by means of an encompassing sealing ring 23.

Within the brake piston 16, the spindle nut 15 can move axially forwards towards the brake disk 20 during rotation of the spindle 14 or can move axially rearwards until reaching a stop 21 during an opposite rotation of the spindle 14. To produce a clamping force the spindle nut 15 acts on the inner end face of the brake piston 16, whereby the brake piston 16, which is axially movably supported in the braking device, is pressed with the brake lining 17 against the facing end face of the brake disk 20.

For the hydraulic braking force, the hydraulic pressure of the brake fluid 22 from the hydraulic vehicle brake 1 acts on the brake piston 16. The hydraulic pressure can also act in support during operation of the electromechanical braking device when the vehicle is at a standstill, so that the total braking force is composed of the portion provided by the electric motor and the hydraulic component. While the vehicle is travelling, either only the hydraulic vehicle brake is active or both the hydraulic vehicle brake and also the electromechanical braking device are active or only the electromechanical braking device is active to produce braking force. The control signals for controlling both the adjustable components of the hydraulic vehicle brake 1 and also the electromechanical wheel brake device 9 are produced in the regulating or control unit 11.

Figure 3:
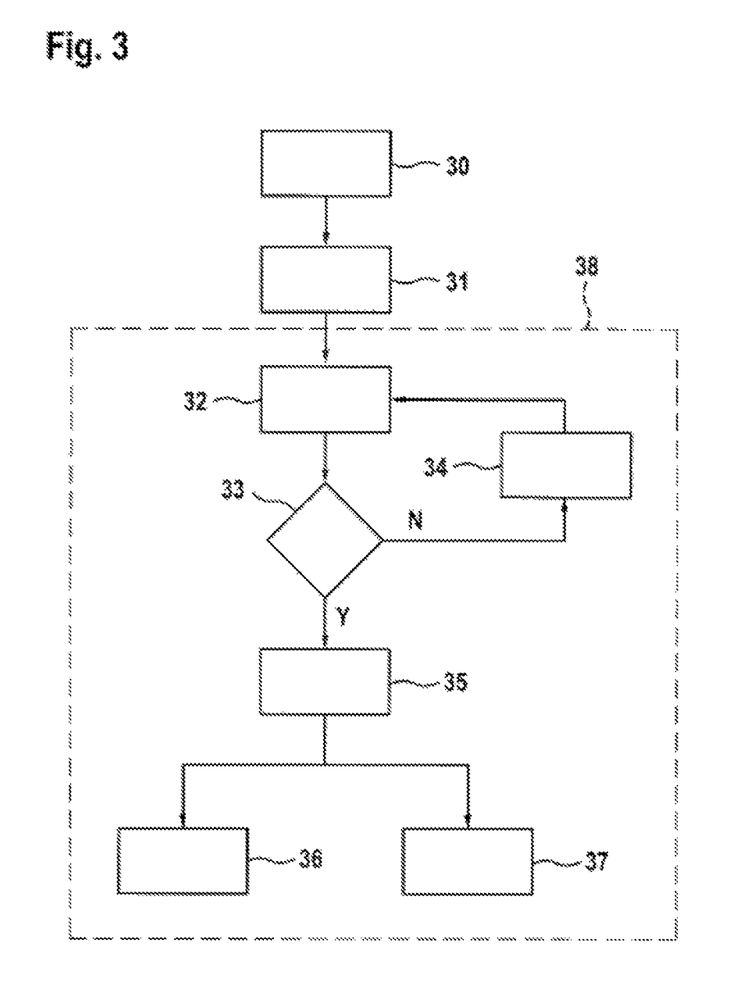
FIG. 3 shows a flow chart with process steps for braking a vehicle in the event of a failure of the brake booster.

FIG. 3 shows a flow chart with process steps for braking a vehicle in the event of a failure of the brake boosting. The vehicle is equipped with a brake system that comprises a hydraulic vehicle brake with wheel brake devices on the front axle and the rear axle as well as electromechanical braking devices with electric brake motors on the wheel brake devices of the rear axle.

Step 30 of the process symbolizes the normal operating state of the brake system with properly functioning hydraulic vehicle brakes. The vehicle is being braked by means of the hydraulic vehicle brake to implement a driver's braking demand. The electromechanical braking device on the rear axle is used as a parking or holding brake to produce a clamping force holding the vehicle at a standstill.

In the subsequent process step 31, a failure or partial failure of the brake boosting in the hydraulic vehicle brake is determined. In order to still ensure a minimum deceleration of the vehicle, the brake system is operated according to the subsequent process steps 32 through 37 at a fallback level 38, in which both the hydraulic vehicle brake and also the electromechanical braking device are operated for braking the vehicle.

Initially, in the step 32 following the determination of a failure or partial failure of the brake boosting, the electric brake motor of the electromechanical braking device is activated and moved towards the braking or clamping position until a brake contact point is reached, at which the brake piston including the brake lining that is acted on by the brake motor is in contact with the brake disk without an air gap or with a considerably reduced air gap. In this case, no braking force is still being produced electromechanically, but an electromechanical braking force can be produced without delay in the event of a subsequent braking demand.

In the next step 33, a query is made as to whether a driver's braking demand exists. If this is not the case, the no branch ("N") is then advanced to step 34, in which a check is made as to whether the wheel brake devices on the front axle and the rear axle are hydraulically coupled, so that the same hydraulic brake pressure is applied to all wheel brake devices. If this is not the case, for example because of a previous hydraulic decoupling of the brake circuits of the hydraulic vehicle brake or the wheel brake devices on the front and rear axles, then hydraulic coupling of all wheel brake devices is carried out by suitable switching of the valves, in particular by opening the inlet valves on the wheel brake devices of the rear axle. Then the process returns to the step 32 and checks again whether a driver's braking demand exists at cyclical intervals in the step 33.

If the query in the step 33 returns that a driver's braking demand exists and is to be implemented, the yes branch ("Y") is subsequently advanced to the next step 35, in which the wheel brake devices on the rear axle are hydraulically decoupled from the wheel brake devices on the front axle. This is carried out by closing the inlet valves at the wheel brake devices on the rear axle.

The subsequent steps of the method 36 and 37 are carried out simultaneously. In the step 36, the actuation of the wheel brake devices on the front axle of the vehicle is carried out hydraulically. Because the wheel brake devices on the rear axle are hydraulically decoupled, the operation of the brake pedal by the driver acts exclusively on the wheel brake devices on the front axle.

At the same time the electric brake motors on the wheel brake devices on the rear axle are activated and moved in the clamping direction, so that an electromechanical braking force is produced on the wheel brake devices on the rear axle (step 37). By the hydraulic operation of the wheel brake devices on the front axle and the electromechanical operation of the wheel brake devices on the rear axle, in total a vehicle deceleration is achieved that reaches the minimum deceleration required by law. Moreover, the driver is given a natural brake feel, whereby startled responses can be avoided.

Following termination of the driver's braking demand, the wheel brake devices on the front axle and the rear axle are advantageously hydraulically coupled again. Moreover, it is advantageous that the electric brake motors on the wheel brake devices on the rear axle are controlled towards the release positions until the brake contact point is reached, at which the brake piston is in contact with the respective brake disk without an air gap.

Figure 4:
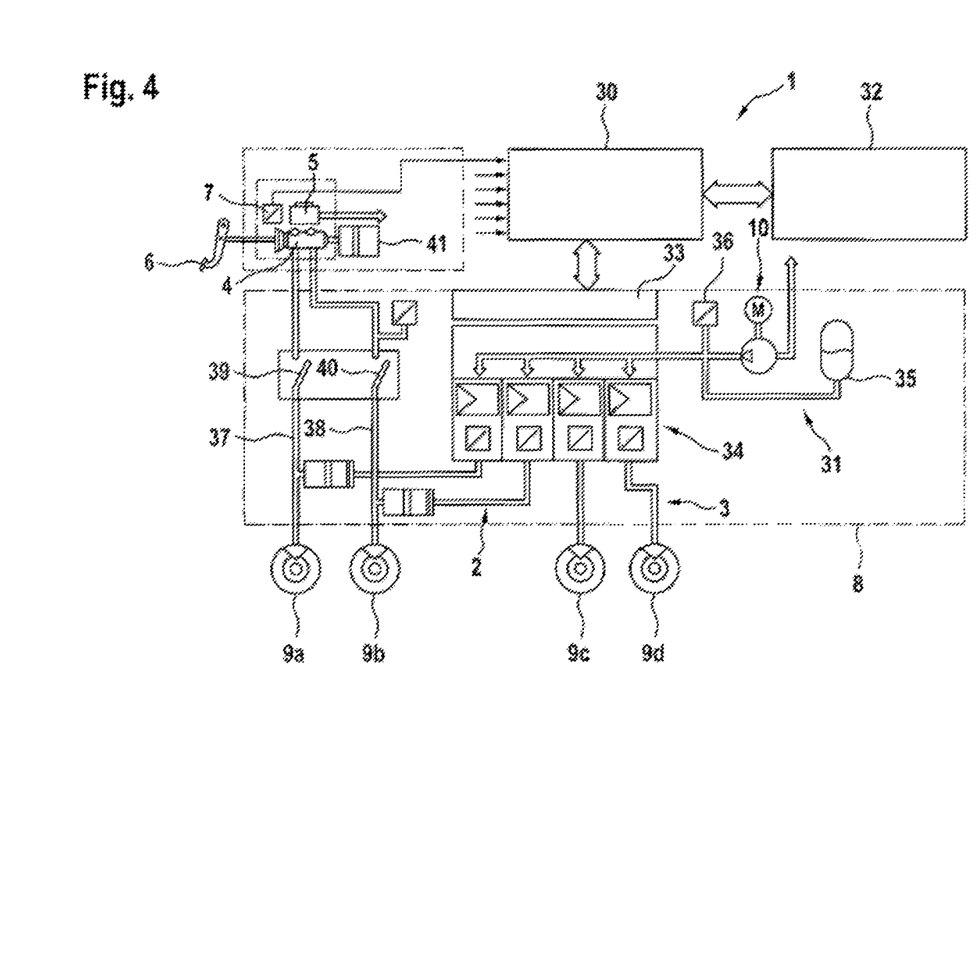
FIG. 4 shows a schematic representation of a further hydraulic vehicle brake with additional electromechanical braking devices on the wheel brake devices on the rear axle of the vehicle.

In FIG. 4 a hydraulic vehicle brake 1 is represented, which is implemented as an electrohydraulic brake, with which the pedal displacement of the brake pedal 6 is detected by means of the pedal travel sensor 7 and a hydraulic power supply 31 for providing the necessary hydraulic brake pressure is controlled by means of a brake function model 30. In the brake function model 30, the signals for the brake boosting and braking force distribution to the individual wheel brake devices 9a to 9d are generated, possibly taking into account the signals of vehicle management systems 32, wherein driver assistance systems, such as for example an electronic stability program (ESP), a traction control system (TCS) or an anti-lock braking system (ABS), can also be implemented.

The corresponding signals are transmitted in the brake hydraulic system 8 to an interface 33, via which the hydraulic power supply 31 as well as wheel pressure modulators 34 are controlled to set the desired wheel brake pressure in the wheel brake devices 9a to 9d. The hydraulic power supply 31 comprises a brake booster 10 with a hydraulic pump driven by an electric motor as well as a high-pressure reservoir 35, from which the brake fluid is delivered, and a pressure sensor 36. The wheel pressure modulators 34 are connected downstream of the hydraulic power supply 31 and each comprises an adjustable valve and a pressure sensor per wheel brake device 9a to 9d.

The vehicle brake 1 is also provided with hydraulic supply lines 37 and 38 that run between the master brake cylinder 4 and the wheel brake devices 9a, 9b on the front axle. A controllable isolating valve 39, 40 is integrated within each hydraulic supply line 37, 38, the valve being opened and closed during normal brake operation so that the hydraulic supply between the master brake cylinder 4 and the wheel brake devices 9a, 9b is interrupted. If, however, the brake booster 10 fails partly or fully, the isolating valves 39, 40 are closed and switched to pass flow, so that there is hydraulic access between the master brake cylinder 4 and the wheel brake devices 9a, 9b on the front axle and a hydraulic brake pressure is built up in the wheel brake devices 9a, 9b by operating the brake pedal.

A pedal travel simulator 41 that is used to impart a natural pedal feel during normal brake operation is connected downstream of the master brake cylinder 4. A valve can be disposed between the master brake cylinder 4 and the pedal travel simulator 41 that is shut off in the event of partial or complete failure of the brake booster 10 to decouple the pedal travel simulator 41 and, if the isolating valves 39, 40 are closed at the same time, to ensure that brake fluid passes to the wheel brake devices 9a and 9b via the hydraulic supply lines 37, 38.

The vehicle brakes according to FIG. 4 with the electromechanical braking devices on the wheel brake devices 9c and 9d on the rear axle can be operated similarly to the vehicle brakes according to FIG. 1 in the manner described above in the event of a partial failure or a complete failure of the brake boosting by hydraulically decoupling the wheel brake devices on the rear axle in the event of a braking process, so that no hydraulic braking force is acting on the wheel brake devices 9c and 9d of the rear axle. At the same time, the electromechanical braking device in each wheel brake device 9c, 9d on the rear axle is operated so that braking force is produced electromechanically on said wheel brake devices 9c and 9d.

The hydraulic brake pressure that is transferred to the wheel brake devices 9a and 9b on operating the brake pedal 6 via the isolating valves 39, 40 that are switched to pass flow and the supply lines 37 and 38 acts on the wheel brake devices 9a and 9b on the front axle. An additional brake pressure may be produced in the front wheel brake devices 9a and 9b by means of the hydraulic power supply 31 if the actuator 10 is still capable of providing hydraulic brake pressure.

What is claimed is:

1. A method for braking a vehicle in response to an at least partial failure of a brake boosting of a hydraulic brake system with at least one first brake circuit and at least one second brake circuit, the method comprising:
    detecting the at least partial failure of the brake boosting of the hydraulic brake system and, in response to the detection of the at least partial failure:
        operating the hydraulic brake system to reduce a hydraulic brake pressure in at least one wheel brake device disposed on a first vehicle axle;
        operating at least one electric brake motor of an electromechanical braking device to produce a braking force on the at least one wheel brake device; and
        in response to receiving a further braking demand during a predetermined period of time after termination of a braking demand, adjusting a plurality of valves disposed on at least one first wheel brake device disposed on a front axle of the vehicle and a plurality of valves disposed on at least one second wheel brake device disposed on a rear axle of the vehicle such that the at least one first wheel brake device and the at least one second wheel brake device are at least partially hydraulically coupled.

2. The method according to claim 1, wherein the operating the hydraulic brake system to reduce the hydraulic brake pressure in the at least one wheel brake device includes operating the hydraulic brake system to fully cut off the hydraulic brake pressure from the at least one wheel brake device.

3. The method according to claim 1, wherein:
the at least one wheel brake device includes two wheel brake devices; and
the at least one electric brake motor includes two electric brake motors, a respective one of which is assigned to each of the two wheel brake devices.

4. The method according to claim 1, wherein the first vehicle axle on which the at least one wheel brake device is disposed is a rear axle of the vehicle.

5. The method according to claim 1, further comprising:
operating the hydraulic brake system to maintain a second hydraulic brake pressure of at least one further wheel brake device that is disposed on a second axle and that is not assigned an electric brake motor.

6. The method according to claim 1, further comprising:
upon detection of the at least partial failure of the brake boosting and prior to receiving an indication of the braking demand from an operation of the vehicle, operating the electric brake motor to move the electric brake motor in a clamping direction until the electric brake motor reaches a braking contact point whereat a brake lining of a brake piston acted on by the electric brake motor is in contact with a brake disk without an air gap but does not produce an electromechanical braking force on the brake disk.

7. The method according to claim 1, further comprising:
after the termination of the braking demand by an operator of the vehicle, operating the electric brake motor to move the electric brake motor to a release position.

8. The method according to claim 7, further comprising:
operating the electric brake motor until the electric brake motor reaches a braking contact point whereat a brake lining of a brake piston acted on by the electric brake motor is in contact with a brake disk without an air gap but does not produce an electromechanical braking force on the brake disk.

9. The method according to claim 8, wherein the operating of the electric brake motor until the electric brake motor reaches a braking contact point is delayed by the predetermined period of time after the termination of the braking demand.

10. The method according to claim 1, further comprising:
the operating of the at least one electric brake motor of the electromechanical braking device to produce the braking force further comprising opening an outlet valve disposed on the at least one wheel brake device; and
after producing the braking force, closing the outlet valve.

11. The method according to claim 1, wherein the operation of the electric brake motor of the electromechanical braking device is only performed in response to an input deceleration value exceeding a target deceleration threshold value.

12. The method according to claim 1, further comprising:
operating an electrically controlled actuator to perform the brake boosting.

13. The method according to claim 12, wherein:
the electrically controlled actuator is a plunger; and
the operating of the electrically controlled actuator includes operating a further electric motor to drive the electrically controlled actuator.

14. The method according to claim 12, wherein the electrically controlled actuator is disposed along an additional hydraulic supply line that is positioned between a brake fluid reservoir and the at least one wheel brake device.

15. The method according to claim 1, further comprising:
performing the brake boosting via an electrically controlled actuator that is connected to the at least one wheel brake device via a first hydraulic supply line; and
in response to the at least partial failure of the brake boosting of the hydraulic brake system:
switching an isolating valve disposed along a second hydraulic supply line that is positioned between a master brake cylinder and the at least one wheel brake device to pass flow; and
opening the second hydraulic supply line.

16. The method according to claim 15, wherein the electrically controlled actuator is an electrically operated pump.

17. A regulating or control unit operably connected to a hydraulic brake system and an electromechanical braking device and configured to produce non-transitory control signals to operate the hydraulic brake system and the electromechanical braking device to, in response to an at least partial failure of a brake boosting of the hydraulic brake system:
operate the hydraulic brake system to reduce a hydraulic brake pressure in at least one wheel brake device disposed on a first vehicle axle;
operate at least one electric brake motor of the electromechanical braking device to produce the braking force on the at least one wheel brake device; and
in response to receiving a further braking demand during a predetermined period of time after termination of a braking demand, adjusting a plurality of valves disposed on at least one first wheel brake device disposed on a front axle of the vehicle and a plurality of valves disposed on at least one second wheel brake device disposed on a rear axle of the vehicle such that the at least one first wheel brake device and the at least one second wheel brake device are at least partially hydraulically coupled.

18. A brake system for a vehicle, comprising:
a hydraulic brake system including at least one first brake circuit and at least one second brake circuit;
at least one wheel brake device disposed on a vehicle axle and operably connected to one of the first brake circuit and the second brake circuit;
an electromechanical braking device including at least one electric brake motor operable to produce a braking force on the at least one wheel braking device; and
a regulating or control unit operatively connected to the at least one wheel brake and the at least one electric brake motor, and configured to, in response to an at least partial failure of a brake boosting of the hydraulic brake system:
operate the hydraulic brake system to reduce a hydraulic brake pressure in the at least one wheel brake device;

operate the electric brake motor of the electromechanical braking device to produce the braking force on the at least one wheel brake device; and in response to receiving a further braking demand during a predetermined period of time after termination of a braking demand, adjust a plurality of valves disposed on at least one first wheel brake device disposed on a front axle of the vehicle and a plurality of valves disposed on at least one second wheel brake device disposed on a rear axle of the vehicle such that the at least one first wheel brake device and the at least one second wheel brake device are at least partially hydraulically coupled.

19. The brake system according to claim 18, further comprising:

an electrically controlled actuator connected to the at least one wheel brake device via a first hydraulic supply line and configured to perform the brake boosting;

a further electric motor configured to drive the electrically controlled actuator; and an isolating valve disposed along a second hydraulic supply line that is positioned between a master brake cylinder and the at least one wheel brake device, wherein the electrically controlled actuator is a plunger.

* * * * *